Aug. 28, 1956 W. T. HARRIS 2,761,077
MAGNETOSTRICTIVE CERAMIC TRANSDUCER
Filed March 27, 1952 2 Sheets-Sheet 1

INVENTOR.
WILBUR T. HARRIS
BY
Mitchell Bechert
ATTORNEYS

Aug. 28, 1956 W. T. HARRIS 2,761,077
MAGNETOSTRICTIVE CERAMIC TRANSDUCER
Filed March 27, 1952 2 Sheets-Sheet 2

INVENTOR.
WILBUR T. HARRIS
BY
Mitchell & Bechert
ATTORNEYS

United States Patent Office 2,761,077
Patented Aug. 28, 1956

2,761,077
MAGNETOSTRICTIVE CERAMIC TRANSDUCER

Wilbur T. Harris, Southbury, Conn., assignor to The Harris Transducer Corporation, Woodbury, Conn., a corporation of Connecticut Application March 27, 1952, Serial No. 278,836

3 Claims. (Cl. 310—26)

My invention relates to electro-acoustic transducer means and, in particular, to such means employing a ceramic magnetostrictive core.

It is an object of the invention to provide an improved construction and method of construction for devices of the character indicated.

It is another object to provide an improved means whereby noise may be held to a minimum in a transducer of the character indicated.

It is a specific object to provide underwater, air, and geophone applications in constructions incorporating broad features of the invention.

Other objects and further features of the invention will be pointed out or will become apparent from a reading of the following specification, in conjunction with the accompanying drawings. In said drawings, which show, for illustrative purposes only, preferred forms of the invention:

Figs. 1, 2, and 3 are simplified longitudinal sectional views illustrating progressive stages in a method of construction according to the invention;

Figure 7:
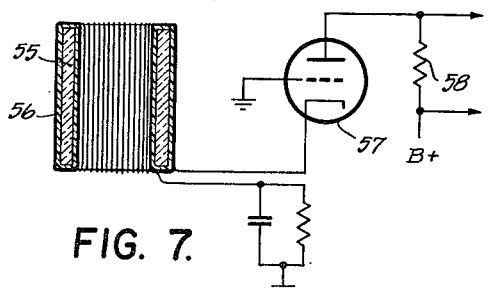
Figure 8:
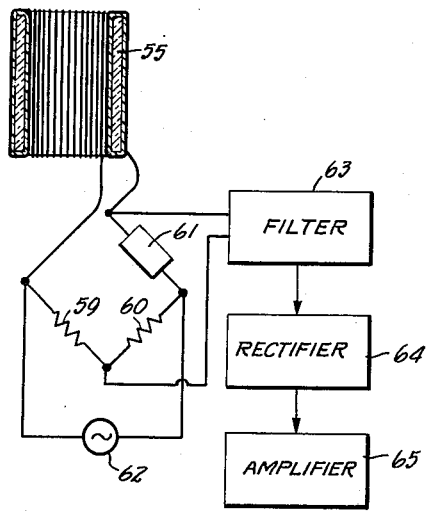
Figure 9:
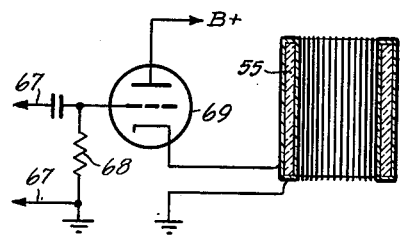
Figure 10:
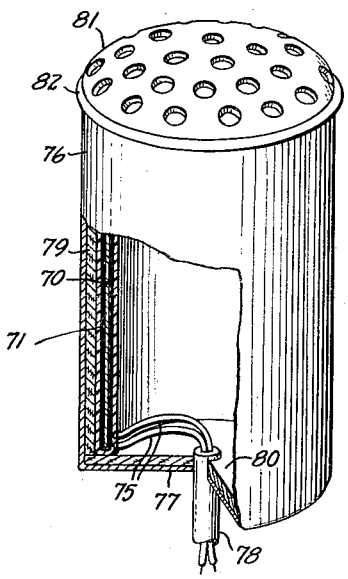
Figure 11:
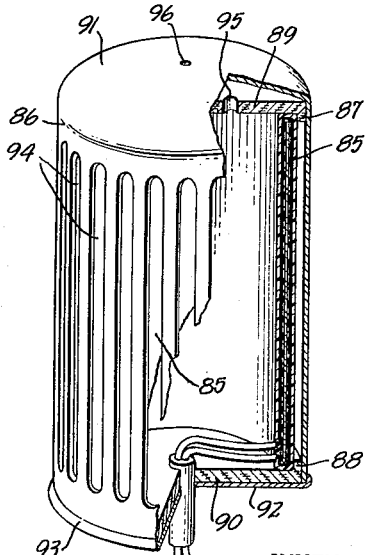

Figs. 7, 8, and 9 are circuit diagrams, schematically showing electrical connections for transducers of the character indicated; and Figs. 10 and 11 are perspective views of two different microphones incorporating features of the invention, both views being broken away to illustrate internal construction.

Briefly stated, my invention contemplates a transducer construction employing a core of magnetostrictive ceramic which may be of a class of materials known as ferrites, comprising a substantial proportion of $Fe_3O_4$, the magnetic oxide of iron. Such materials have a specific resistance, or resistivity, of the order of $10^7$ ohms-cm., as compared with metals for which the specific resistance is of the order of $10^{-5}$ ohms-cms. This great difference in specific resistance can account for such substantial reduction in eddy-current phenomena as to render such considerations unnecessary for the ferrites.

In accordance with the invention, I employ the magnetostrictive ceramic cores in annular or cylindrical shape, and in order to reduce noise effects occasioned by direct contact of the core with the winding (even with an insulated winding), I provide a layer of electrically insulating material between the winding and the core. This layer may be produced by dipping the core in a plastic material having the desired properties, and the electrical winding may be applied after the plastic has substantially hardened. In order to produce a rugged assembly, the wound coated core may thereafter be potted or coated again with similar plastic material. If desired, pressure-release layers may be cast into the plastic in various relationships with the winding and with the core, depending upon the application, in order to provide different directional responses. I shall describe several specific transducer constructions embodying the basic elemental assembly of the core and winding, and shall show several electrical circuit connections for such constructions.

Figure 1:
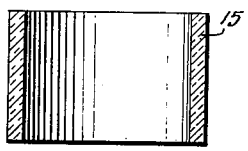
Figure 2:
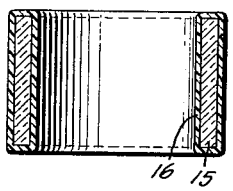
Figure 3:
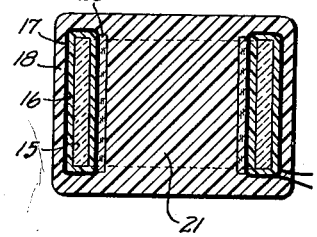

In Figs. 1 to 3 of the drawings, I illustrate steps in the basic method of the invention. I commence with a core of magnetostrictive ceramic material of high permeability and, in the form shown, the core 15 is cylindrically annular. Next, I apply to the core 15 insulating protection which is preferably in intimate pressure-transmitting relation with the core. A coating 16 of plastic will serve the purpose, and the coating 16 of Fig. 2 has been applied successfully by dipping the core 16 into liquid plastic and by allowing the amount retained by surface tension to harden. The natural surface of a ceramic core of the present variety is characterized by small sharp projections and by small pockets between projections; the coating 16 should be of a thickness to fill the pockets and at least thinly to cover the sharp projections. The coating 16 preferably is of a material having sound-transmitting properties in the medium in which the transducer is to be employed; for example, in transducers for underwater use, the coating 16 is preferably of a material having substantially the sound transmitting properties of water. In all drawings, proportions have been exaggerated, particularly where layers, including plastic coatings, are concerned; this will be understood to be purely for the purpose of emphasizing the structure.

After the plastic layers 16 has hardened sufficiently, a toroidal winding 17 may be wound about the coated core to complete a basic transducer element; enameled wire will suffice for the winding 17. The construction may be made more rugged by applying a further coat 18 of insulating sound-transmitting material; such further coat 18 may be applied by merely dipping the wound coated core into the same plastic as was used for the coat 16, so as to assure a good sound-transmitting relation between the plastic layers 16—18, and with the core 15. If desired, as for directional properties in the basic element, a layer of pressure-release material 20 may be wrapped around the core for its effective longitudinal length before applying the final plastic; in the form shown, pressure release is obtained by a layer of cork 20 laid in the bore of the wound coated element 15 before the final plastic is applied. If desired, a solid cylinder, as shown in Fig. 3, may be formed in this final elemental operation. It will be understood that the interior of the bore at 21, although filled with sound-transmitting material, may nevertheless be effectively isolated from the bore, due to presence of the pressure-release means 20.

Figure 4:
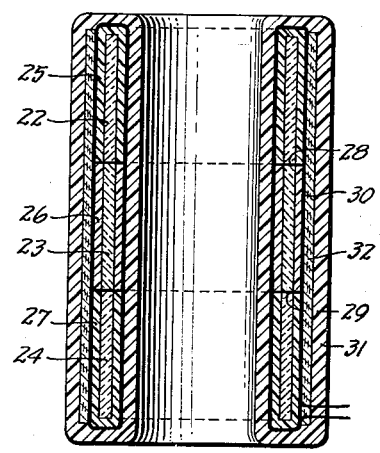
Fig. 4 is a longitudinal sectional view of a modified transducer element incorporating features of the invention.

The core 15 may be formed in any proportions desired for a wide range of applications, but in accordance with a further feature of the invention I provide the core element 15 of such proportions that, when ganged in multiple, it may be adapted to a plurality of specific needs. In Fig. 4, I illustrate this point with a basic transducer assembly utilizing a plurality of core elements 22—23—24, all preferably of the same proportions; these proportions may also be those of the basic element 15 of Fig. 1. The core elements 22—23—24 may be held in end-to-end relation against each other prior to the first dipping in plastic, so that one dipping effectively coats the entire core. However, in the form shown, I illustrate my preference for separately dipping or coating each of the elements 22—23—24 before end-to-end assembly; thus, an inner layer 25 of plastic coats the element 22, a separate inner layer 26 coats the element 23, and still another inner layer 27 coats the core element 24.

The individual layers 25—26—27 may be allowed to set before end-to-end assembly, but I provide a more rugged construction by squeezing the coated elements against each other in end-to-end relation before the plastic has become completely hardened. This fact is schematically indicated in Fig. 4 by the heavy lines at 28—29 to illustrate the residual plastic between individual ceramic elements 22—23 and 23—24. After this core assembly has hardened into a unit, the toroidal winding 30 may be applied to envelop all three core elements as a single core, and the final coating 31 of electrically insulating sound-transmitting material may be applied; however, in the form illustrated in Fig. 4, I provide a layer of cork or other pressure-release material wrapped around the wound coated cores before applying the final plastic coat 31.

Figure 5:
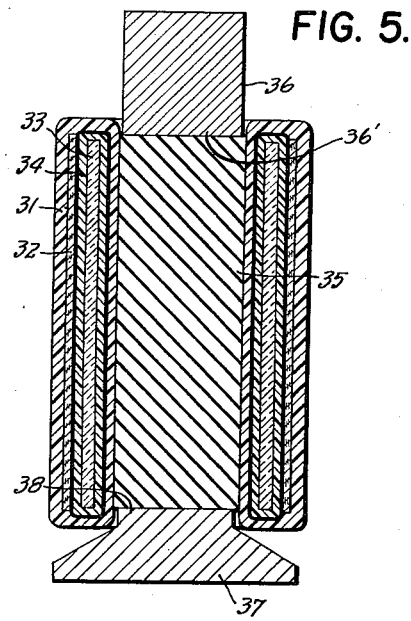
Fig. 5 is a sectional view illustrating a specific transducer utilizing an element of proportions similar to those in Fig. 4.

In Fig. 5, I illustrate how a basic transducer construction, as above described, may be directly applied to an underwater directionally responsive device having many of the features described in my copending patent application Serial No. 127,437, filed November 15, 1949, now Patent No. 2,638,577. The basic transducer unit of Fig. 5 may be that of Fig. 4 and, therefore, the various coatings and other layers have been given the same reference numbers. However, for simplification, I have shown the core 33 and the inner coating 34 on the core to be of unit construction of the type described in Figs. 1 to 3. The entire transducer may be filled with rho-c rubber, neoprene, plastic, or other sound-transmitting resilient material, as schematically indicated at 35. At one end a counterweight member 36 may include a piston portion 36' substantialy closing off the interior, in intimate pressure-transmitting relation with the material 35. If desired, diaphragm means 37 may deliver axial pressure loads to the material 35; diaphragm 37 is shown to have a piston portion 38 for this purpose. As explained in the above-identified patent application, I prefer that the proportioning of the elements be such that the frequency of resonance in the longitudinal mode shall differ from the frequency of resonance in the radial mode, so that the electrical output or response may exhibit relatively broad-band characteristics.

Figure 6:
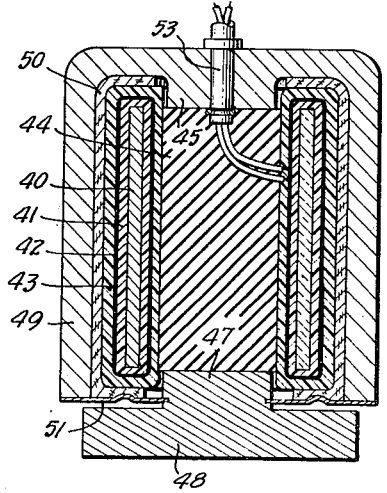
Fig. 6 is a vertical sectional view of a geophone incorporating features of the invention.

In Fig. 6, I illustrate application of the basic transducer-element construction of the invention for geophone uses. The construction may thus comprise a core 40 of ceramic magnetostrictive material, an inner coating 41 of plastic or other insulating pressure-transmitting material, a toroidal winding 42, and an outer coating 43 of plastic or the like, which may be similar to the coating 41. The interior of the device may be filled, as by potting, with a slug 44 of resilient pressure-transmitting material. As in the case of Fig. 5, counterweight means may have a piston portion 45 effectively closing off one end of the transducer cylinder, and in intimate pressure-transmitting relation with the slug 44, while the piston portion 47 of a diaphragm member 48 may have the same intimate relation with the slug 44 and substantially close off the other end of the transducer cylinder.

One of the members 45—47 may be integrally formed with a skirt 49, encasing the entire device for purposes of ruggedness; in the form shown, the skirt 49 is cast with the counterweight 45, for this purpose and for the additional purpose of increasing the mass of the counterweight. If desired, a layer 50 of cork or other pressure-release material may be wrapped around the transducer assembly before it is inserted in the skirt 49 of the counterweight. The entire device may be sealed off with an axially flexible diaphragm member 51 carried by the end of the skirt 49 and by the piston portion 47 of the diaphragm means 48. In addition to sealing off the assembly, the diaphragm 51 may be radially stiff so as to prevent radial dislocations at the otherwise unsupported end of the counterweight, thus preserving life and effectiveness of the basic transducer element and of the pressure-release layer 50. Electrical leads to the winding 42 may be brought out through the material 44 (if cast therein) and through the counterweight piston 45 to a cable 53.

Figs. 7, 8, and 9 illustrate various electrical circuit employments of magnetostrictive ceramic transducers of the character indicated. In Fig. 7, the transducer 55 is employed as a microphone. It may be of the construction described above as including a magnetostrictive ceramic core, with a insulating layer 56 between the core and the winding. The output leads are shown connected to the input of amplifier means 57, which happens to be a triode with input connections in the cathode circuit thereof, so that tube current may polarize the transducer. The grid may be grounded, and the output taken across a resistance 58 in the plate circuit of the tube 57.

In Fig. 8, the transducer 55 is shown connected in a bridge circuit of the type described in greater detail in my copending application Serial No. 219,194, filed April 4, 1951. The bridge may be of the four-terminal variety, employing matched impedances 59—60 in two arms, and a ballast impedance 61 in a third arm to match the nominal impedance of the transducer element 55. The bridge may be excited by an alternating current source 62 of relatively high frequency, that is, of a frequency beyond that for which a response is desired from the transducer 55. The bridge output will then be a modulated carrier with the modulations reflecting relatively low-frequency transducer excitation. I have shown filter means 63 to eliminate undesired modulation products, rectifier means 64 to derive the modulating envelope, and amplifier means 65 to process the envelope for recording or other purposes. The described circuit will be understood to observe the transducer as an inductance which varies with pressure, so that the circuit provides a means for absolute measurement of or response to pressure.

In Fig. 9, I have shown the transducer 55 employed as a projector. The signal to be radiated is applied at input connections 67, across a resistance 68 in the control circuit of amplifier means 69. The amplifier means 69 happens to be a triode, and output is taken from the cathode circuit by connecting the transducer 55 in series therewith.

In Figs. 10 and 11, I illustrate two specific microphone constructions embodying the above-discussed elemental configuration. In Fig. 10, a cylindrical core 70 of magnetostrictive ceramic is coated and then toroidally wound at 71, and then preferably again coated, the thickness of the coatings being preferably held to a minimum. Lead wires may be brought out of the winding 71 internally of the core 70 and at one end thereof, and attention should be given, at the point where the lead wires come off the winding, to assure that a second coating of plastic fully covers all possibly exposed parts of the wires, even to the point of including some of the normal insulation 75 for the lead wires. The construction is rendered rugged by encasing in a container which may be a thin metal can 76, having a cylindrical periphery with an integral end or bottom 77 through which the lead wires may be brought out to a cable 78. A layer of pressure-release material, such as cork 79, may serve to position the transducer in the container and also to shield against external radial response. To reduce ambiguous end response, a further layer of pressure-release material, such as a cork disc 80, may be laid over the entire bottom of the can 76. The other end of the microphone may be covered or closed by a perforated dome-shaped cap 81, beaded as at 82 to the open end of the can 76. In operation, in air or under water, the device of Fig. 10 will be freely flooded with the sound-transmitting medium, and response will be limited essentially to symmetry about the central axis of the configuration and in the direction of the cap 81.

In Fig. 11, I show a similar can microphone, featuring a radial response rather than an axial response. The transducer 85 of Fig. 11 may be of the same built-up construction as that described in Fig. 10 except, of course, that no pressure-release material envelops any part of the cylinder of the transducer. The entire construction may be held in the container 86 by means of locating rings or gaskets radially spacing the transducer from the container walls, and end response may be reduced by employing discs 89—90 of pressure release material, such as cork, at both ends of the transducer 85; in the form shown, the locating rings or gaskets are formed as axial flanges or rims 87—88 on the disc 89—90. The container 86 is shown with an integral dome-shaped bottom 91 in which the cork disc 89 is first seated, with the transducer fitted within the rim or flange 87. The disc 90 may then be applied, with its rim 88 positioning the other end of the transducer. Assembly may be completed upon placing the cover 92 over the open end and by beading at 93.

If the device of Fig. 11 were potted in the space between the cylindrical wall of can 86 and the coated winding of element 85, with a material having sound-transmitting characteristics of the medium in which the device is to respond, then there would be no need for special treatment of the wall of the can 86, beyond assurance of its relative thinness so as not to interfere with pressure-response. However, in the form shown, the device is rendered responsive to sound in air, by provision of a number of openings 94 in the periphery; these openings are shown as longitudinal slots angularly spaced around the can 86. The radial space defined by flanges 87—88 is thus left open. In air applications, the interior of the transducer element 85 is filled with air, and an axial opening 95 in the cork layer 89 and an axial opening 96 in the top end 91 may assure equalization for ambient pressure.

It will be appreciated that I have described an improved method, producing a relatively simple transducer construction having substantially improved properties in comparison with other known magnetostrictive configurations. My constructions all feature the substantial elimination of eddy-current losses; this improvement is significant even when compared to the performance of very thinly laminated metallic magnetostrictive constructions. My construction is rugged and is featured by low inherent noise.

In accordance with my construction, it is possible to achieve a wide variety of configurations to meet particular performance specifications, with but a few basic core shapes.

While I have described my invention in detail for the preferred forms illustrated, it will be understood that modifications may be made without departing from the scope of the invention as described in the claims which follow.

I claim:

1. In an electroacoustic magnetostrictive transducer, a plurality of annular ceramic magnetostrictive core elements of like inner and outer diameters, potting material bonding said core elements to each other in aligned end-to-end relation, whereby a consolidated core is formed, an electrically conductive toroidal winding coupled to and enveloping the full longitudinal length of said consolidated core, said potting material being of substantially the sound-transmitting properties of water and in intimate sound-transmitting relation with all said cores and with said winding and suspending said winding in spaced relation with said consolidated core.

2. A transducer according to claim 1, and including a layer of pressure-release material overlying the periphery of the wound consolidated core, said potting material fully enveloping said pressure-release material.

3. A transducer according to claim 1, in which said potting material so fully encases said core elements and winding as to define a continuous smooth cylindrical outer wall and a continuous smooth cylindrical inner wall joined by smooth continuous radial end faces.

References Cited in the file of this patent

UNITED STATES PATENTS

| | | |
|---|---|---|
| 2,438,926 | Mott | Apr. 6, 1948 |
| 2,452,531 | Snoek | Oct. 26, 1948 |
| 2,519,277 | Nesbitt et al. | Aug. 25, 1950 |
| 2,521,136 | Thuras | Sept. 5, 1950 |
| 2,572,313 | Burns | Oct. 23, 1951 |
| 2,599,068 | Potter | June 3, 1952 |
| 2,617,882 | Roberts | Nov. 11, 1952 |
| 2,636,860 | Snoek et al. | Apr. 28, 1953 |